United States Patent Office

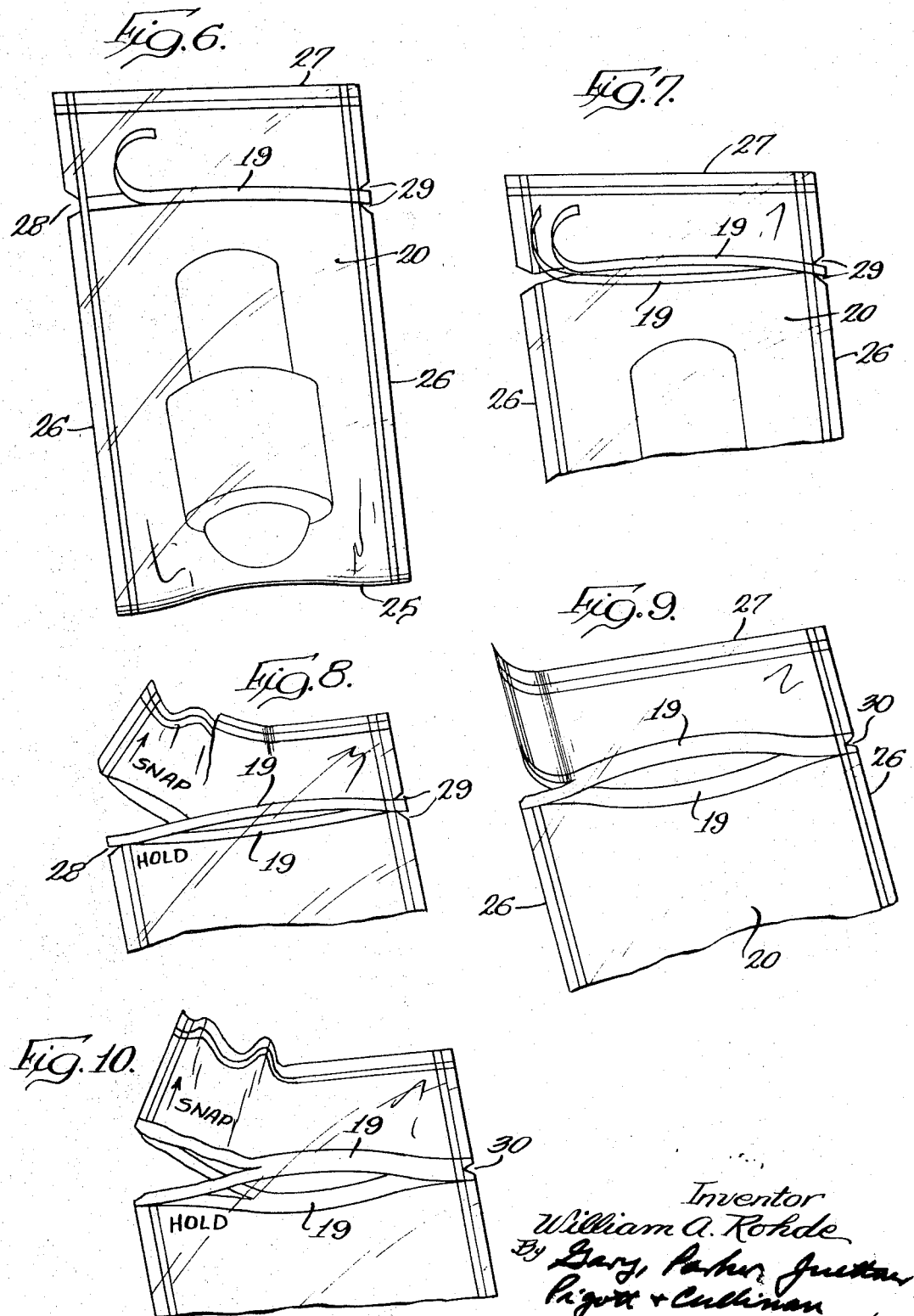

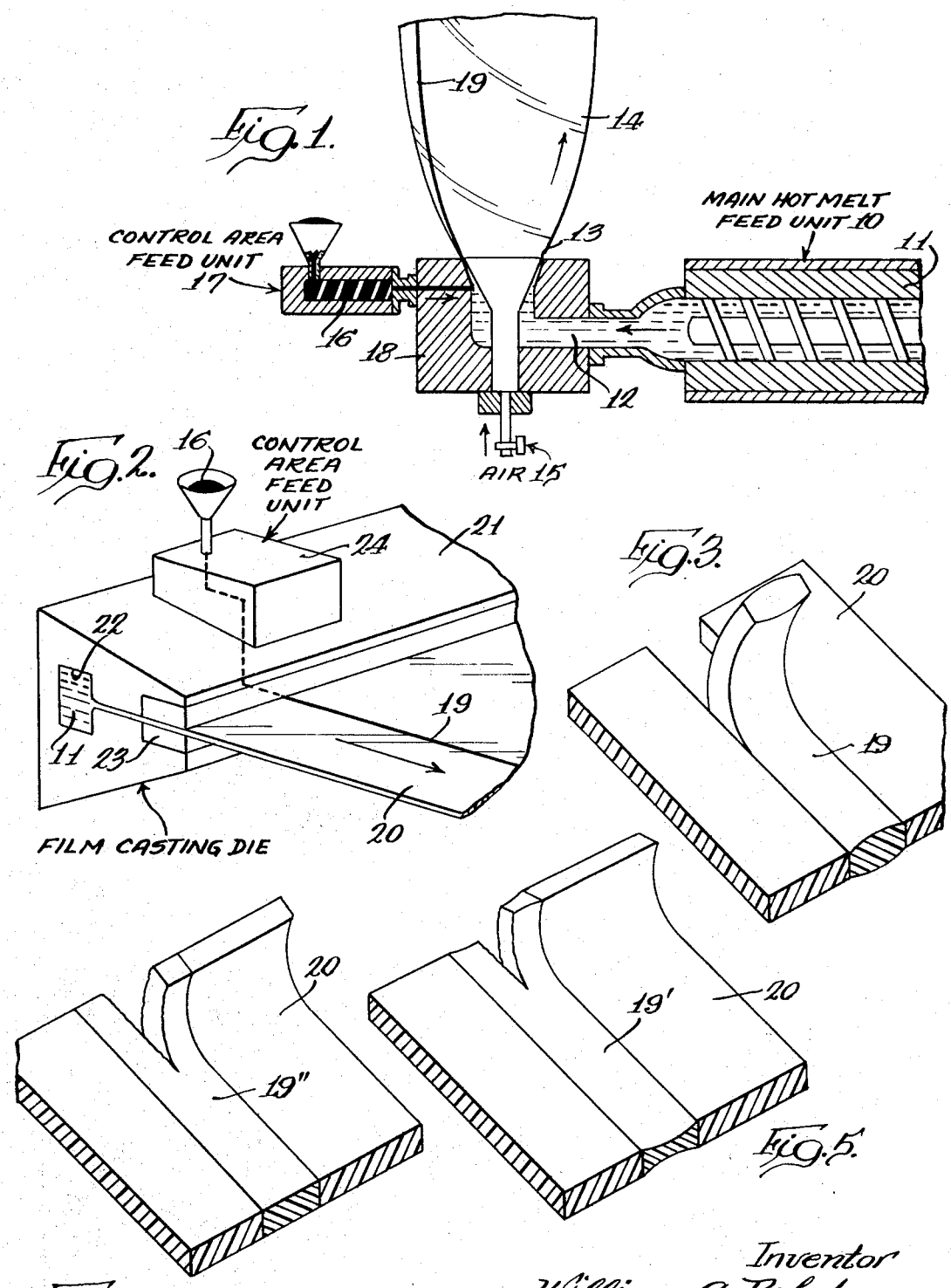

3,535,409
Patented Oct. 20, 1970

3,535,409
METHOD OF MAKING SHEET MATERIAL WITH FILM TEAR LINE
William A. Rohde, Wheeling, Ill., assignor to Tower Products, Inc., Wheeling, Ill., a corporation of Illinois
Original application Jan. 17, 1967, Ser. No. 609,810, now Patent No. 3,368,740, dated Feb. 13, 1968. Divided and this application Nov. 13, 1967, Ser. No. 682,011
Int. Cl. B29c 23/00
U.S. Cl. 264—95                    4 Claims

ABSTRACT OF THE DISCLOSURE

Flexible thermoplastic sheet material including a relatively narrow band of coalesced compound thermoplastic material of different character extending substantially through the thickness of the sheet, said band demarking a zone of severance facilitation; coextrusion of said sheet and band from a common die; apparatus for accomplishing said coextrusion; and receptacles formed of said composite sheet material.

---

This application is a division of my copending application, Ser. No. 609,810, filed Jan. 17, 1967, now Pat. No. 3,368,740.

The present invention relates to the production of sheet material suitable for packaging, such as in the form of receptacles or envelopes, which can be fully sealed before or after packing an article or articles therein, and which is characterized by a band demarking a zone of severance facilitation whereby the closed receptacle or package can be readily opened as by tearing or snapping.

The present invention also relates to packages or envelopes formed of said sheet material.

The present invention further relates to a novel method and apparatus for forming the characterizing sheet material.

Packages fabricated from plastic films, i.e. plastic sheet material have been difficult to open since their introduction in the 1930's. Various devices and innovations have been tried to solve this problem, such as tear tapes attached to the package, perforations in the film, release-type adhesives, and others.

The present approach to the problem was to produce a sheet with a novel control area in the machine direction either weaker or stronger than the body of the sheet as a whole.

Thus, the present invention provides flexible thermoplastic sheet material including a relatively narrow band of coalesced compatible thermoplastic material extruded therewith, but of different character and extending into or substantially through the thickness of the sheet. This band demarks a zone of severance facilitation or control area. Conveniently this control area is identified by the use of pigment mixed with the control material, said control area extending in the machine direction or direction of formation, and may either be weaker or stronger than the body of the adjacent film. This control area or built-in integral tear strip which extends into the thickness of the sheet can be composed of material possesing a lower tear strength than that of the main body of film and thus provide a weaker path through the film without reducing the film thickness, the film being adapted to be separated along this path by snapping apart or tearing therealong.

On the other hand, the control area can be formed from a material possessing a higher tear and tensile strength than the main body of the film, providing a tear strip which is an integral part of the film and can be removed leaving the film separated and the package opened. Thus, the plastic material of the main sheet can differ from that of the relatively narrow tear strip or control band by being either weaker or stronger, more linear or less linear, higher density or lower density, and is composed of such materials as polyethylene, polypropylene and other polyolefins, nylon, or modified plastic such as rubber modified polyethylene, and other compatible thermoplastics.

Other objects and advantages of the present invention, its details of construction and arrangement of parts, method and economies thereof will be apparent from a consideration of the following specification and accompanying drawings, in which:

FIG. 1 is a diagrammatic illustration partly in section illustrating one method and means for carrying out the process of the present invention.

FIG. 2 is a diagrammatic fragmentary perspective view of another form of apparatus for carrying out the process of the present invention.

FIG. 3 is an enlarged fragmentry perspective view of a sheet formed with a characterizing control band or tear strip in accordance with the present invention.

FIG. 4 is an enlarged fragmentary perspective view of a sheet formed with a modified characterizing control band or tear strip in accordance with the present invention.

FIG. 5 is an enlarged fragmentary perspective view of a sheet formed with another modified characterizing control band or tear strip in accordance with the present invention.

FIG. 6 is a perspective view of a package formed of the sheet material of the present invention having an article sealed therein.

FIG. 7 is a view similar to FIG. 6 of a modified form of package.

FIG. 8 is a fragmentary perspective view showing one method of opening the sealed package formed from the sheet material of the present invention.

FIG. 9 is a view similar to that of FIG. 8 showing a modified method and means for opening the package.

FIG. 10 is a still further modified view of a package similar ot that of FIG. 8 illustrating another method and means for opening the sealed package.

Referring to the drawings, particularly FIG. 1, the reference numeral 10 shows a main hot melt feed unit for introducing molten thermoplastic 11 into the die orifice 12 wherefrom it issues through the annular lip 13 and is expanded into the tube 14 by blowing air into it from the source 15. As this tube 14 is being formed, thermoplastic material 16 is fed from the second extruder or control area feed unit 17 into the die 18 and the die cavity 12 at a point inwardly of the annular die lip 13 whereat it moves under pressure and displaces the first plastic 11 for a relatively narrow band or control area 19 to result in a sheet or film 20 having the band 19 extending in the machine direction or direction of formation and into and through or substantially through the thickness of the sheet 20. This band 19 can be thicker than the sheet 20 as shown in FIG. 3, or can be thinner than the sheet 20 in the form of the band 19' as shown in FIG. 5, or the band 19" of equal thickness of the sheet 20 as shown in FIG. 4.

Suitably this secondary thermoplastic material 16 which forms the band 19 is pigmented so that it is of a color contrasting the color of the sheet 20 which normally remains transparent.

By way of example, the sheet material 20 can be composed of polyethylene of low density, i.e. 0.923 g./cc. The plastic material 16 forming the band 19 can be composed of green pigmented, rubber-modified high density polyethylene, the density of the latter being for example 0.938. In another example, the base sheet 20 can be composed of low density polyethylene (0.923) whereas the coextruded band 19 can be composed of black pigmented medium density (0.933) polyethylene. Other compatible plastics of varying density can be employed as previously indicated.

Although the illlustration of FIG. 1 shows blow extrusion, film casting technique can be employed as illustrated in FIG. 2. Here the die 21 is fed molten plastic 11 into the die cavity 22 from a source, not shown, wherefrom it issues from the lips 23 in the form of the sheet 20. Simultaneously, thermoplastic material 16 is fed from the control feed unit 24 to the die 21 at any point in the die prior to issuance of the sheet material from the lip 23 so that it merges and displaces the main body of plastic in a narrow band or strip 19 to form the sheets as shown in FIGS. 3, 4 and 5 previously described, the band 19 again being in the machine direction or issuance of the sheet formation.

When the band 19 is formed through the use of material possessing a lower tear strength than that of the main body of the sheet 20, this provides a weaker path through the film without necessarily reducing the film thickness. The film may now be separated along this path by snapping apart or tearing along this path.

The use of these bands 19 (or 19' or 19") is shown in FIGS. 6 to 10 wherein envelopes are formed sealed on all sides with or without an object enclosed therein. It will be understood that it is sometimes desirable to form a completely sealed package without any contents in order to keep the package sterile until used, after which a portion of the package can be torn off at the bands 19 of the present invention, an object placed therein and the open mouth reclosed by for example tying. On the other hand, packages such as shown in FIG. 6 can be vended in the form of envelopes closed on three sides with the fourth side open, into which the objects can be placed and this fourth open side then heat sealed. Thus, the package in FIG. 6 is shown to be formed of a sheet of material doubled over at 25, first sealed at the sides 26, 26, and then sealed at the edge 27, with an object disposed therein or not as desired or required. In this case, the built-in unitary control band or tear strip 19 extends adjacent and parallel to the edge 27, and for ease in grasping it in opening the package, the package may be notched at the side edges as at 28 or 29, as shown in FIG. 6.

As shown in FIG. 7, the opposed faces of the bag can each be provided with a built-in tear strip 19 so that both may be disengaged from the package if desired.

When the control area 19 is formed through the use of a material possessing a higher tensile strength than that of the main body of the sheet, this provides a built-in integral tear strip which is an integral part of the film and can be removed leaving the film separated and the package opened as shown in FIGS. 6 and 7.

On the other hand, the package may be opened by manually grasping the two portions on opposite sides of the built-in tear strip or strips 19 and snapped apart, the material of the package 20 separating from the tear strip 19 along the edges at which they are welded together, aided by the starting notches 28 and 29.

FIGS. 9 and 10 show packages similar to those previously described but in these cases the edges of the packages are provided with notches 30 extending into the tear strip 19 so that the package portions as described with respect to FIGS. 7 and 8 respectively can be separated in a similar manner. Thus, in the case of FIG. 9 the package may be separated by tearing within the body of the tear strip 19 or the package snapped apart within the tear lines 19.

As previously indicated, it will be noted from the illustrations of FIGS. 1 and 2 that the secondary plastic introduced into the primary melt flow tends to displace the primary stream of melt and tends to maintain its position and composition within the melt mass, and is thus a characterizing principle of the present invention. As displacement under pressure occurs, the peripheral area of the two materials bond to form a continuous film that can be heat sealed and fabricated in various ways as illustrated in FIGS. 6 and 10. The control material or secondary plastic forming the tear strip band can be introduced at any point after the primary melt leaves the mixing and feed chamber. That is, when an extruder is employed to advance the primary melt, the secondary melt can be introduced immediately after the primary melt leaves the feed screw in the throat section or can be added in the die proper.

In general, when the band 19 is weaker than the main body 20 of the package a line which will tear or snap apart usually in the area 19 is created, and conversely when the band 19 is of greater strength than the sheet 20 tearing or snapping apart is facilitated at the borders of the strip 19 where is merges with the sheet 20, and in the instance where the strip or band 19 is stronger than the base film 20 the package is opened by removing the tear strip as a whole rather than separating within the body thereof when the strip 19 is weaker than the adjacent sheet 20.

Although the relative thickness of the control strip or band 19, 19' or 19" with respect to the sheet 20 is controlled in part by the melt temperature and flow pressure applied on the molten plastic material as it leaves the secondary extruder, the thickness of the control strip is primarily determined by the type of material added to form this area. That is, for example, a relatively high density type material will tend to remain thicker than the adjacent sheet since the forces, machine direction and transverse, applied to the sheet will not draw down this material as much as the base sheet or tube, because the high density material is tougher and therefore resists elongation. In contrast to this, relatively medium density materials used for a control strip can be selected with flow properties similar to the adjacent sheet material.

There is obviously a distinctive advantage in forming the high density (high strength) area tear strip thicker than the base sheet, since this will markedly increase the strength differential of the materials and allow for ease of removal of the tear strip. In forming the medium density (low strength) rupturable area thickness is not as great a factor. Though the film will rupture easier if the control area is thinner, or of the same thickness as the base film, satisfactory results can be obtained with a thicker control area with much less manipulation of the secondary extruder operating conditions. As previously indicated, however the essential feature is that the control area is formed by combining dissimilar materials.

While I have shown and described preferred embodiment of my invention, it will be understood by those skilled in the art that changes may be made in the details thereof without departing from the scope as comprehended by the following claims.

I claim:

1. The method of making a flexible thermoplastic sheet material including a relatively narrow band of coalesced compatible thermoplastic material of different character extending substantially through the thickness of the sheet, said band demarking a zone of severance facilitation, which comprises extruding a first molten thermoplastic material through a sheet forming die to form said sheet material and simultaneously extruding a second molten compatible thermoplastic material of different character in a relatively narrow band into the path of said first molten material and under pressure sufficient to displace the first molten material from the path of the second before is issues from the die.

2. The method of claim 1 wherein the sheet is formed by the blown film process.

3. The method of claim 1 wherein the sheet is formed by the cast film process.

4. Molding apparatus comprising a die for forming sheet material, means for introducing thereto a first thermoplastic material to be sheeted in molten condition, and separate means for introducing to said die and into the path of said first thermoplastic material a second molten thermoplastic material of different character than the former in a relatively narrow restricted zone whereby to substantially displace the former from said zone and to coextrude said plastic materials.

References Cited
UNITED STATES PATENTS

| | | | |
|---|---|---|---|
| 3,034,941 | 5/1962 | Hessenthaler et al. | 264—171 |
| 3,223,761 | 12/1965 | Raley | 264—171 X |
| 3,405,425 | 10/1968 | Buckley | 264—171 |
| 3,336,174 | 8/1967 | Dyer et al. | 156—167 |
| 2,932,855 | 4/1960 | Bartlett et al. | 264—171 |
| 3,441,637 | 4/1969 | Davis | 264—295 |

ROBERT F. WHITE, Primary Examiner

R. H. SHEAR, Assistant Examiner

U.S. Cl. X.R.

18—5; 118—13; 264—171